United States Patent [19]

Parfree et al.

[11] 4,350,046

[45] Sep. 21, 1982

[54] CABLE STRAIN MONITORING

[75] Inventors: Colin S. Parfree; Peter Worthington, both of Southampton, England

[73] Assignee: International Standard Electric Corporation, New York, N.Y.

[21] Appl. No.: 206,427

[22] Filed: Nov. 13, 1980

[30] Foreign Application Priority Data

Nov. 15, 1979 [GB] United Kingdom ............... 7939607

[51] Int. Cl.$^3$ ............................................. G01B 7/16
[52] U.S. Cl. ........................................ 73/768; 57/19; 57/265
[58] Field of Search .................... 73/772, 768, 760; 350/96.23; 57/1 R, 6, 7, 19, 264, 265

[56] References Cited

U.S. PATENT DOCUMENTS 3,779,071  12/1973  Thomas, Jr. et al. ............ 73/768 X
4,278,835   7/1981  Jackson ........................ 350/96.23 X

OTHER PUBLICATIONS

Mitsunaga, Y. et al. Strain Measurement in Coated . . . Wire, from Transactions of IECE of Japan, vol. E62, No. 9, Sep. '79, pp. 620 and 621.

Primary Examiner—Jerry W. Myracle
Attorney, Agent, or Firm—John T. O'Halloran; Robert E. Lee, Jr.

[57] ABSTRACT

A major problem in the manufacture of optical fibre cables is the strain to which the fibres are subjected, which strain could damage the fibres. To enable this strain to be monitored, and hence remedial action to be taken, one or more metallic elements are incorporated in the cable, each such element with its insulation being similar in thickness to an optical fibre with its sheath. The electrical resistance of the metallic elements varies very little with temperature, but does vary with strain, so by monitoring resistance, one monitors strain.

Although mainly intended for use during manufacture, the method can be used whenever strain monitoring is needed.

4 Claims, No Drawings

CABLE STRAIN MONITORING

BACKGROUND OF THE INVENTION

The present invention relates to a strain monitoring technique for use, for instance, in the manufacture of optical fibre cables.

Optical fibres are relatively weak when compared with the metallic conductors used in electrical cables so that it is desirable that the fibres be subjected to as little strain as possible while making the cables. Such a cable usually includes a number of separate optical fibres which are assembled into the cable, and an object of this invention is to provide a method of monitoring the strains to which optical fibres are subjected while a cable is being assembled or installed or used when in service.

SUMMARY OF THE INVENTION

According to the invention there is provided a method of monitoring the strain to which the optical fibres of an optical fibre cable are subjected which includes providing the cable with at least one thin metallic element which is assembled with the fibres, the electrical resistance of the material of which this element is made being variable with the strain to which the element is subjected, and monitoring the electrical resistance of the thin metallic element during the assembly of the cable, the result of the monitoring being indicative of the strain to which the cable is and hence the optical fibres are subjected.

DESCRIPTION OF THE PREFERRED EMBODIMENTS

In a multi-fibre cable, each optical fibre has its own cladding which is covered by a sheath of a plastic material, similar to the insulation on a conventional electrical wire. The metallic filament used for the monitoring referred to above is also covered by a sheath of plastic material and its outside diameter is preferably the same as or almost the same as that of a sheathed optical fibre. The preferred material for this filament is an electrical resistance alloy sold under the Registered Trademark CONSTANTAN since its variations of resistance with temperature are low.

During manufacture a current is caused to flow in the filament, and this is connected to a resistance measuring instrument, which can be one of a number of commercially available instruments of this type. Then the variations in resistance of the filament are monitored and if the resistance indicates that the strain is approaching a dangerous level, some remedial action is taken to reduce that strain to a more acceptable level.

If access to both ends of the cable for this monitoring is not convenient, then two such filaments are provided, and joined at one end, with the resistance of the two filaments connected in series being monitored.

Although the method has been described as applied during cable manufacture it is also usable on other occasions when strain monitoring is desirable.

The electrical resistance alloy referred to above, and which is sold under the Registered Trademark CONSTANTAN is an alloy of 55% copper and 45% nickel.

We claim:

1. A method of monitoring the strain to which the optical fibres of an optical fibre cable are subjected comprising:
   providing said cable with at least one metallic element, the electrical resistance of the material of the element being variable with the strain to which the element is subjected,
   positioning said metallic element with at least one optical fiber having a sheath into said optical fibre cable,
   applying a current through said metallic element, and monitoring the electrical resistance of said metallic element during assembly of the cable.

2. The method as claimed in claim 1 in which said optical fibre cable includes two of said metallic elements, and in which said elements are connected together at one end of the cable and the monitoring performed between the other ends of the two metallic elements.

3. The method as claimed in claim 1 or 2 in which said metallic element is an alloy of 55% copper and 45% nickel.

4. The method as claimed in claim 1 or 2 in which said optical fibres and said metallic elements are provided with sheaths, the outside diameters of said sheathed optical fibres and said sheathed metallic elements being substantially the same.

* * * * *